United States Patent
Hwang et al.

(10) Patent No.: US 9,298,257 B2
(45) Date of Patent: Mar. 29, 2016

(54) APPARATUS AND METHOD FOR CONTROLLING AVATAR USING EXPRESSION CONTROL POINT

(75) Inventors: Young Kyoo Hwang, Seoul (KR); Jung Bae Kim, Hwaseong-si (KR); Won Chul Bang, Bundang-gu (KR); Do Kyoon Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 685 days.

(21) Appl. No.: 13/307,541

(22) Filed: Nov. 30, 2011

(65) Prior Publication Data

US 2012/0139830 A1    Jun. 7, 2012

(30) Foreign Application Priority Data

Dec. 1, 2010    (KR) ........................ 10-2010-0121533

(51) Int. Cl.
    *G06T 13/00*    (2011.01)
    *G06F 3/01*    (2006.01)
    *G06K 9/00*    (2006.01)

(52) U.S. Cl.
    CPC ............ *G06F 3/012* (2013.01); *G06K 9/00221* (2013.01); *G06K 9/00302* (2013.01); *G06T 2207/30196* (2013.01)

(58) Field of Classification Search
    CPC ........... G06K 9/00302; G06K 9/00221; G06T 2207/30196; G06T 2207/30201
    USPC ....................................................... 345/473
    See application file for complete search history.

(56) References Cited

U.S. PATENT DOCUMENTS

| | | | |
|---|---|---|---|
| 6,940,454 B2 | 9/2005 | Paetzold et al. | |
| 8,233,046 B2 * | 7/2012 | Ohue et al. | 348/148 |
| 2009/0202114 A1 * | 8/2009 | Morin et al. | 382/118 |
| 2009/0276802 A1 | 11/2009 | Amento et al. | |
| 2011/0288816 A1 * | 11/2011 | Thierman | 702/151 |

FOREIGN PATENT DOCUMENTS

| | | |
|---|---|---|
| JP | 2000-194876 | 7/2000 |
| JP | 2000-331190 | 11/2000 |
| JP | 2006-331065 | 12/2006 |
| KR | 10-2004-0032452 A | 4/2004 |
| KR | 10-2004-0037152 A | 5/2004 |
| KR | 10-2006-0097074 A | 9/2006 |
| KR | 10-2008-0111325 A | 12/2008 |
| KR | 10-2010-0025862 A | 3/2010 |
| KR | 10-2010-0049776 A | 5/2010 |

OTHER PUBLICATIONS

Tian et al. Recognizing action units for facial expression analysis, Feb. 2001 ,IEEE Computer Society, 97-115.*
Lien et al., Detection, tracking, and classification of action units in facial expression, Available Online May 2, 2000, vol. 31, Issue 3, pp. 131-146.*
Zhu et al., Eye and gaze tracking for interactive graphic display, Published online Jun. 8, 2004, 15, pp. 139-148.*

\* cited by examiner

*Primary Examiner* — Barry Drennan
*Assistant Examiner* — Robert Craddock
(74) *Attorney, Agent, or Firm* — NSIP Law

(57) ABSTRACT

An apparatus and method for controlling an avatar using expression control points are provided. The apparatus may track positions of feature points and a head movement from an expression of a user, remove the head movement from the positions of the feature points, and generate expression control points. Accordingly, the expression of the user may be reflected to a face of the avatar.

19 Claims, 9 Drawing Sheets

APPARATUS AND METHOD FOR CONTROLLING AVATAR USING EXPRESSION CONTROL POINT

CROSS-REFERENCE TO RELATED APPLICATIONS

This application claims the benefit of Korean Patent Application No. 10-2010-0121533, filed on Dec. 1, 2010, in the Korean Intellectual Property Office, the disclosure of which is incorporated herein by reference.

BACKGROUND

1. Field

One or more example embodiments of the following description relate to an apparatus and method for controlling an avatar, and more particularly, to an apparatus and method that generate expression control points from facial expressions of a user and control the avatar using the expression control points.

2. Description of the Related Art

As virtual world services are recently spreading, control of an avatar in the virtual world becomes an essential matter. Therefore, a scheme has been developed for expressing an avatar more realistically by reflecting, to the avatar, a facial expression of a user corresponding to the avatar.

Facial expressions of a person are so subtle that, when minute motions of a user's face fail to be accurately reflected to an avatar, the avatar's expression appears artificial. Accordingly, there is a desire for a scheme capable of tracking changes in facial expressions of the user more accurately and controlling the avatar to appear more natural.

SUMMARY

The foregoing and/or other aspects are achieved by providing an apparatus including an expression tracking unit to track positions of feature points of a facial expression and a head movement from expression images of a user; a feature point position resetting unit to reset the positions of the feature points of the facial expression by removing the head movement from the tracked positions of the feature points; and a control point generating unit to generate expression control points using an expression parameter based on the reset positions of the feature points.

The apparatus may further include an expression controlling unit to control an expression of an avatar using the expression control points.

The foregoing and/or other aspects are achieved by providing a method including tracking positions of feature points of a facial expression and a head movement from expression images of a user; resetting the positions of the feature points of the facial expression by removing the head movement from the tracked positions of the feature points; and generating expression control points using an expression parameter based on the reset positions of the feature points.

The method may further include controlling an expression of an avatar using the control point.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Reference will now be made in detail to example embodiments, examples of which are illustrated in the accompanying drawings, wherein like reference numerals refer to the like elements throughout. Example embodiments are described below to explain the present disclosure by referring to the figures.

Figure 1:
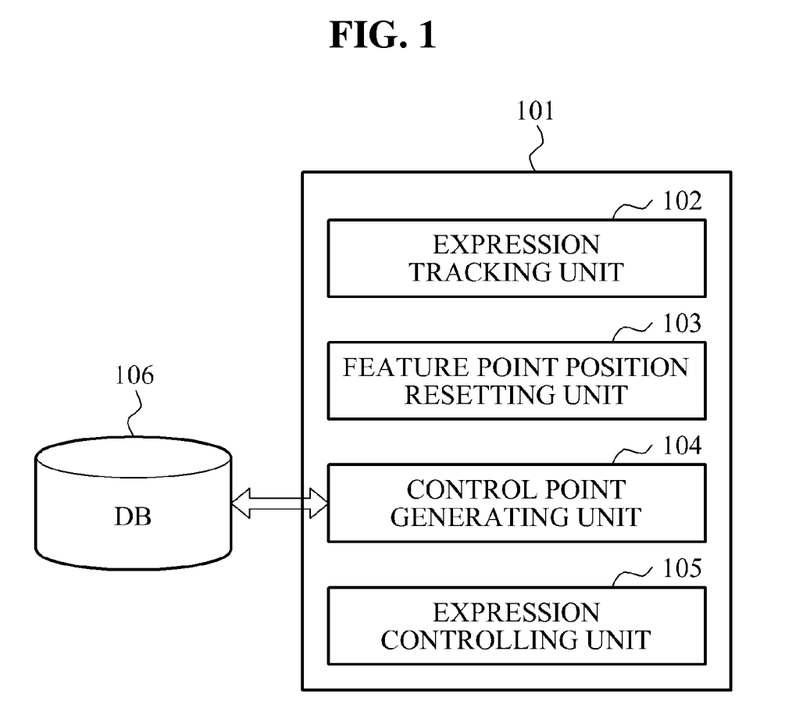
FIG. 1 illustrates a block diagram showing a detailed structure of an apparatus for controlling an avatar, according to example embodiments.

FIG. 1 illustrates a block diagram showing a detailed structure of an apparatus 101 for controlling an avatar, according to example embodiments.

Referring to FIG. 1, the avatar control apparatus 101 may include, for example, an expression tracking unit 102, a feature point position resetting unit 103, a control point generating unit 104, and an expression controlling unit 105.

The expression tracking unit 102 may track positions of feature points of a facial expression and a head movement detected from expression images of a user. Additionally, the expression tracking unit 102 may track an eye movement of the user. For example, the expression images of the user may be collected by one camera. A change in the expressions of the user may be reflected to the expression images collected by the camera.

The expression tracking unit 102 will be described in further detail later with reference to FIG. 2.

The feature point position resetting unit 103 may reset the positions of the feature points of the expression by removing the head movement from the tracked positions of the feature points. To be more specific, the positions of the feature points tracked by the expression tracking unit 102 may be a result of the tracked features reflecting the head movement of the user. The feature point position resetting unit 103 may reset the positions of the feature points with respect to a reference expression of the user, by removing the head movement from the positions of the feature points. The reference expression may refer, for example, to an expression of the user looking in a forward direction.

The feature point position resetting unit 103 will be described in further detail later with reference to FIGS. 3 and 4.

The control point generating unit 104 may generate expression control points using an expression parameter based on the reset positions of the feature points. Here, the reset positions may be the result of removing the head movement from the positions of the feature points tracked by the expression tracking unit 102. For example, the control point generating unit 104 may generate the expression control points using the expression parameter generated from mark-based motion capture data. The control point generating unit 104 will be described in further detail later with reference to FIGS. 5 and 6.

The expression controlling unit 105 may control an expression of the avatar using the generated expression control points. That is, the expression controlling unit 105 may reflect a change in the expression of the user to the expression of the avatar. More specifically, the expression controlling unit 105 may control an eye movement, a head movement, and an expression of the avatar, using the expression control points. The expression controlling unit 105 will be described in further detail later with reference to FIGS. 7 and 8.

Figure 2:
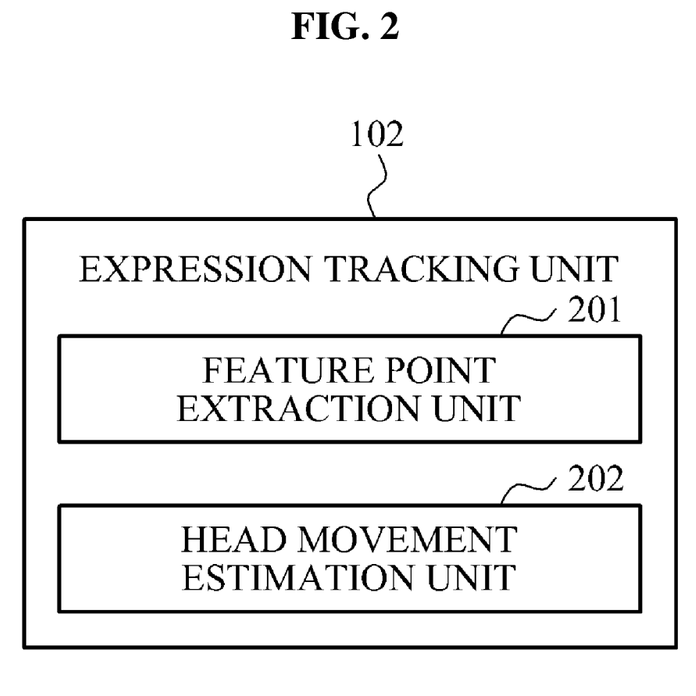
FIG. 2 illustrates a diagram showing an operation of an expression tracking unit shown in FIG. 1.

FIG. 2 illustrates a diagram showing an operation of the expression tracking unit 102 shown in FIG. 1.

The expression tracking unit 102 may include, for example, a feature point extraction unit 201 and a head movement estimation unit 202.

The feature point extraction unit 201 may extract the feature points from the expression images of the user. For example, the feature point extraction unit 201 may extract the positions of the feature points of the expression by learning a facial pattern. The feature points denote specific spots on a face, learned or semantically defined for recognition of a face and facial expressions. In particular, the feature point extraction unit 201 may use an active appearance model (AAM) method to automatically extract the positions of the feature points from the expression images by learning the face pattern.

The head movement estimation unit 202 may estimate the head movement based on a head rotation angle using the positions of the feature points extracted by the feature point extraction unit 201. Here, the head movement may be indicated by a global movement.

For example, the head movement estimation unit 202 may calculate a left surface area and a right surface area of the face by using the positions of the feature points. Here, representative feature points used for obtaining the left surface area and the right surface area may include a feature point disposed in the middle between the eyebrows, feature points disposed along an outline of the face, a feature point disposed at a tip of the nose, feature points disposed around the lips, and the like. More specifically, the head movement estimation unit 202 may calculate the left surface area and the right surface area by drawing triangles using the representative feature points and calculating a sum of a surface area of the triangles.

Next, the head movement estimation unit 202 may estimate the head rotation angle which denotes a posture of the face, using a ratio between the left surface area and the right surface area. It may be presumed that the head rotation angle has a positive value when a head of the user is rotated to the right. The head rotation angle may have a negative value when the head is rotated to the left. Also, the head rotation angle is presumed to be in a range $0° \leq \theta \leq 45°$ when the head is rotated to the right. In this case, the left surface area LHP of the face may be expressed by Equation 1 while the right surface area RHP may be expressed by Equation 2, as follows.

$$LHP = w_1 h_1 + \frac{\pi}{4} w_1 h_2 = (r\cos\theta + r\sin\theta)h_1 + \frac{\pi}{4}(r\cos\theta + r\sin\theta)h_2 \quad \text{[Equation 1]}$$

$$RHP = w_2 h_1 + \frac{\pi}{4} w_2 h_2 = (r - r\sin\theta)h_1 + \frac{\pi}{4}(r - r\sin\theta)h_2 \quad \text{[Equation 2]}$$

wherein, $\theta$ denotes the head rotation angle. $w_1$ denotes a left width of the face, $w_2$ denotes a right width of the face, $h_1$ denotes a cheek length, and $h_2$ denotes a chin length. In addition, r denotes a distance from a center of the head to an outline of the head.

Therefore, the ratio between the left surface area LHP and the right surface area RHP is determined by Equation 3 below. The head rotation angle may be estimated from Equation 4 below.

$$\frac{RHP}{LHP} = \frac{1 - \sin\theta}{\cos\theta + \sin\theta} = \rho \leq 1 \quad \text{[Equation 3]}$$

$$\theta = \sin^{-1}\left(\frac{1}{\sqrt{(\rho+1)^2 + \rho^2}}\right) - \tan^{-1}\left(\frac{\rho}{\rho+1}\right) \quad \text{[Equation 4]}$$

When the head of the user is rotated to the left, a range of the head rotation angle may be presumed to be $-45° \leq \theta \leq 0$. Here, the left surface area LHP is expressed by Equation 5 while the right surface area RHP is expressed by Equation 6 below.

$$LHP = w_1 h_1 + \frac{\pi}{4} w_1 h_2 = (r + r\sin\theta)h_1 + \frac{\pi}{4}(r + r\sin\theta)h_2 \quad \text{[Equation 5]}$$

$$RHP = w_2 h_1 + \frac{\pi}{4} w_2 h_2 = (r\cos\theta - r\sin\theta)h_1 + \frac{\pi}{4}(r\cos\theta - r\sin\theta)h_2 \quad \text{[Equation 6]}$$

wherein, $\theta$ denotes the head rotation angle. $w_1$ denotes a left width of the face, $w_2$ denotes a right width of the face, $h_1$ denotes a cheek length, and $h_2$ denotes a chin length. In addition, r denotes a distance from a center of the head to an outline of the head.

Therefore, the ratio between the left surface area LHP and the right surface area RHP is determined by Equation 7 below.

$$\frac{RHP}{LHP} = \frac{\cos\theta - \sin\theta}{1 + \sin\theta} = \rho > 1 \quad \text{[Equation 7]}$$

The head rotation angle may be estimated from Equation 8 below.

$$\theta = \cos^{-1}\left(\frac{\rho}{\sqrt{(\rho+1)^2 + 1^2}}\right) - \tan^{-1}(\rho + 1) \quad \text{[Equation 8]}$$

In the above described manner, the expression tracking unit 102 may estimate the head rotation angle in roll, pitch, yaw directions according to the head movement.

Figure 3:
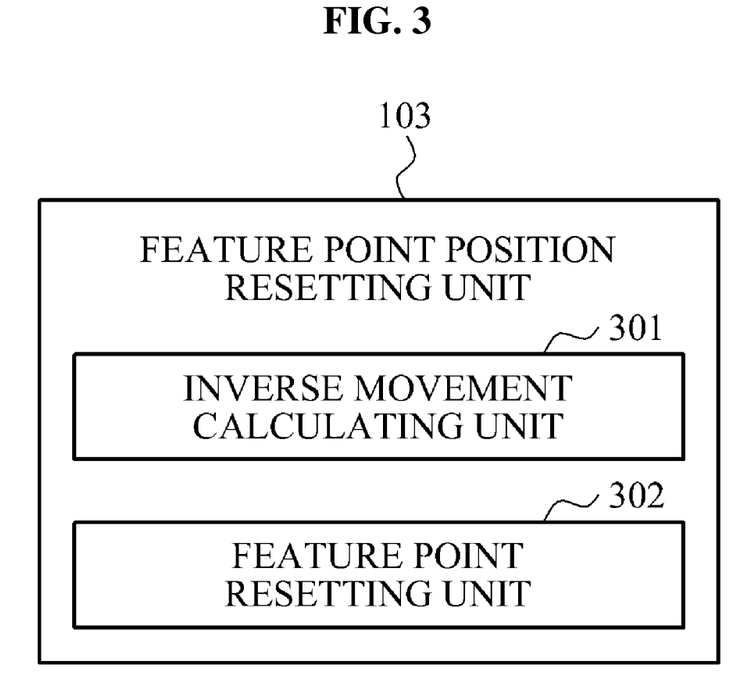
FIG. 3 illustrates a diagram showing an operation of a feature point position resetting unit shown in FIG. 1.

FIG. 3 illustrates a diagram showing an operation of the feature point position resetting unit 103 shown in FIG. 1.

The feature point position resetting unit 103 may include, for example, an inverse movement calculating unit 301 and a feature point resetting unit 302.

The inverse movement calculating unit 301 may calculate any one or more of inverse translation, inverse rotation, and inverse scale based on head movement. When a head movement exists, there may further exist rotation of an X-axis, Y-axis, and Z-axis. Also, changes in positions and scales of the X-axis and the Y-axis may exist.

When it is estimated by the expression tracking unit 102 that the head is rotated in the roll, pitch, and yaw directions by degrees of $-\alpha$, $-\beta$, and $-\gamma$, respectively, the inverse movement calculating unit 301 may calculate a matrix to inversely rotate the head by degrees of $\alpha$, $\beta$, and $\gamma$, using Equation 9.

$$R_x(\alpha) = \begin{bmatrix} 1 & 0 & 0 \\ 0 & \cos\alpha & -\sin\alpha \\ 0 & \sin\alpha & \cos\alpha \end{bmatrix}$$

$$R_y(\beta) = \begin{bmatrix} \cos\beta & 0 & -\sin\gamma \\ 0 & 1 & 0 \\ -\sin\beta & 0 & \cos\beta \end{bmatrix}$$

$$R_z(\gamma) = \begin{bmatrix} \cos\gamma & -\sin\gamma & 0 \\ \sin\gamma & \cos\gamma & 0 \\ 0 & 0 & 1 \end{bmatrix}$$

[Equation 9]

In addition, the inverse movement calculating unit 301 may calculate the inverse translation to move origins of the X-axis and the Y-axis to corresponding feature points, based on positions of fixed feature points which maintain fixed positions in spite of a change in the expression. Alternatively, the inverse movement calculating unit 301 may calculate the inverse translation to move the origins of the X-axis and the Y-axis by obtaining centroids of all the feature points from the reference expression or from an initial frame.

In addition, the inverse movement calculating unit 301 may obtain the centroids of all the feature points from the reference expression or from the initial frame, and may calculate a mean distance $S_0$ of the feature points using the centroids. The inverse movement calculating unit 301 may obtain centroids of all the feature points in a next frame, and calculate a mean distance S' of the feature points using the centroids. Next, the inverse movement calculating unit 301 may calculate the inverse scale which denotes a ratio between the mean distance $S_0$ and the mean distance S'.

The feature point resetting unit 302 may reset the positions of the feature points based on the reference expression of the user looking forward, using any one or more of the calculated inverse translation, inverse rotation, and inverse scale calculated by the inverse movement calculator 301.

For example, the feature point resetting unit 302 may reset the positions of the feature points by removing the head movement from the positions of the feature points tracked by the expression tracking unit 102. Equation 10 shows relations between the tracked positions of the feature points tracked by the expression tracking unit 102 and the reset positions of the feature points.

$$F' = sRF + t$$

[Equation 10]

wherein, F' denotes the tracked position of the feature point tracked by the expression tracking unit 102, F denotes the reset position of the feature point, s denotes scale, R denotes rotation, and t denotes a movement. Therefore, the feature point resetting unit 302 may determine the reset position of the feature point by applying the inverse scale $-S$, the inverse rotation $R^{-1}$, and the inverse translation $-t$ to Equation 10.

Figure 4:
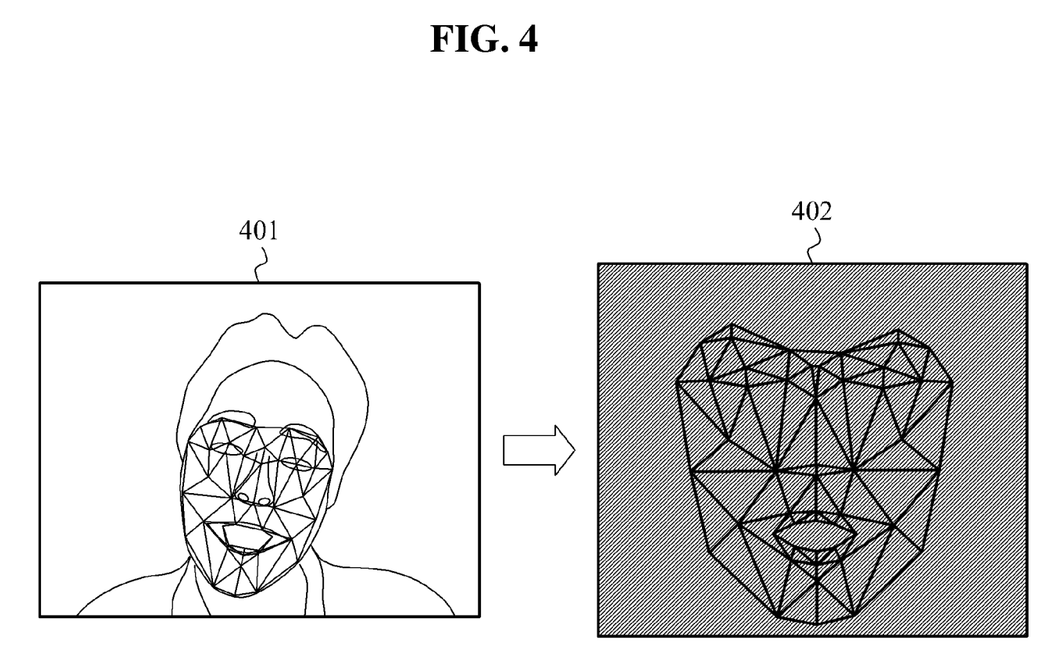
FIG. 4 illustrates a diagram showing an operation of resetting positions of feature points according to example embodiments.

FIG. 4 illustrates a diagram showing an operation of resetting the positions of the feature points according to example embodiments.

Referring to FIG. 4, an image 401 may be an expression image of the user. The positions of the feature points are shown on the image 401. The head of the user in the image 401 is rotated to the left with respect to a center point.

The feature point resetting unit 302 may reset the positions of the feature points shown in the image 401 based on the reference expression of the user looking forward. The reset position of the avatar is shown in an image 402. The expression may be stably analyzed by resetting the positions of the feature points according to the reference expression.

Figure 5:
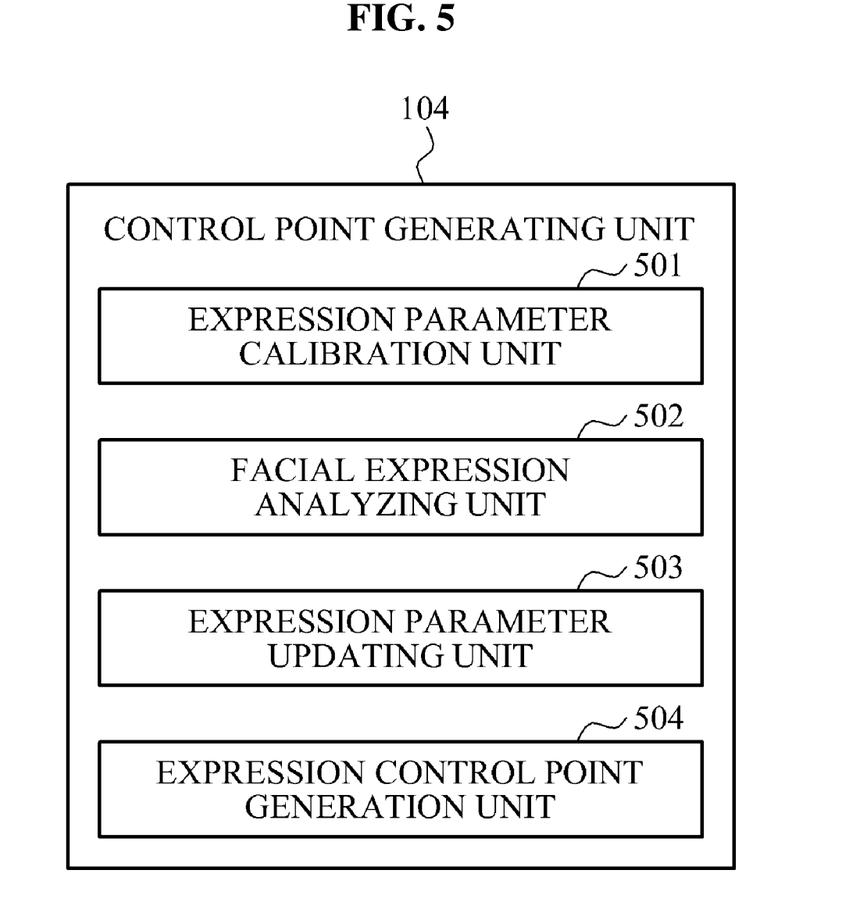
FIG. 5 illustrates a diagram showing an operation of a control point generating unit shown in FIG. 1.

FIG. 5 illustrates a diagram showing an operation of the control point generating unit 104 shown in FIG. 1.

The control point generation unit 104 may include, for example, an expression parameter calibration unit 501, a facial expression analyzing unit 502, an expression parameter updating unit 503, and an expression control point generation unit 504.

The control point generation unit 104 may generate the expression control points using the expression parameter generated from the marker-based motion capture data. The control point generation unit 104 may update the expression parameter in accordance with variation of an expression component based on the reset positions of the feature points and variation of an expression component based on a position of the control point generated from the expression parameter. Hereinafter, the operation of the control point generation unit 104 will be described in detail.

The expression parameter calibration unit 501 may calibrate the expression parameter generated from motion capture data stored in a database (DB) 106 based on the face of the user, and may set an initial expression parameter. The motion capture data denotes position information of markers attached to a face of an actor/actress who is making the reference expression. Positions of the markers are different from the positions of the feature points of the user. The expression parameter refers to a variable for generation of the expression control points, and is denoted by $\lambda$ in Equation 11 below. The expression control points are generated by a principal component analysis.

$$F_c = C_m + \sum_{i=1}^{K} \lambda_i \cdot M_i$$

[Equation 11]

wherein, Fc denotes the expression control point, and M denotes an eigenvector extracted from the motion capture data. Here, $C_m$ is determined by Equation 12 below.

$$C_m = \frac{1}{N} \sum_{f=1}^{N} C_f$$

[Equation 12]

wherein, $C_f$ denotes an expression control point in a f-th frame. $C_m$ denotes an average value of the expression control points in each frame.

In Equation 11, $\lambda$ denotes the expression parameter generated from the motion capture data. However, since the motion capture data is different from the reset feature points of the user, when the expression parameter stored in the DB 106 is directly used, the expression of the avatar will appear totally different from the expression of the user. Therefore, the expression parameter calibration unit 501 needs to calibrate the expression parameter generated from the motion capture data.

Specifically, the expression parameter calibration unit 501 compares the motion capture data stored in the DB 106 with the reset positions of the feature points of the user. Next, the expression parameter calibration unit 501 may compensate for differences in sizes and positions of a mouth, eyes, a nose, eyebrows, and the like of the motion capture data, based on the reset positions of the feature points. This procedure may be performed every time the user changes.

The facial expression analyzing unit 502 may analyze the expression using the motion capture data calibrated by the expression parameter calibration unit 501. More specifically, the facial expression analyzing unit 502 generates the expression parameter from the calibrated motion capture data. In addition, the facial expression analyzing unit 502 may analyze the expression by comparing a variation of the expression component measured according to the expression parameter with the variation of the expression component measured according to the reset positions of the feature points. The expression component refers to components for analysis of the expression. The expression component may include a vertical length of the lips, a horizontal length of the lips, a height of a line segment connecting ends of the lips, a degree of a leftward or rightward movement of an end of the lips, an inclination of a line segment connecting ends of the lips, a raised degree of a right or left eyebrow, a length between left and right eyebrows, a raised degree of left and right sides of a nose, and the like.

Therefore, the facial expression analyzing unit 502 may express the variation of the expression component measured according to the expression parameter and the variation of the expression component measured according to the reset positions of the feature points by vector values, thereby calculating a difference between the vector values. Specifically, the facial expression analyzing unit 502 may calculate the difference using Equation 13 as follows.

$$D(\overline{\lambda} = \{\lambda_1, \ldots, \lambda_k\}) = \quad \text{[Equation 13]}$$
$$\|f(V) - f(C)\| = \left\| f(V) - f\left(C_m + \sum_{i=1}^{K} \lambda_i \cdot M_i\right) \right\|$$

wherein, D denotes the difference between the vectors, that is, a Euclidean distance between a vector f(V) corresponding to the variation of the expression component measured according to the expression parameter and a vector f(C) corresponding to the variation of the expression component measured according to the reset positions of the feature points. In Equation 13, C denotes a set of the expression control points, V denotes a set of the positions of the feature points, and f denotes a function for analysis of the expression.

Here, when D is greater than a predetermined threshold value, the expression parameter updating unit 503 may update the expression parameter. Specifically, the expression parameter updating unit 503 may repeatedly update the expression parameter according to Equation 14 below.

$$\overline{\lambda}_n = \overline{\lambda}_{n-1} - \epsilon \cdot \nabla D(\overline{\lambda}_n) \quad \text{[Equation 14]}$$

wherein, $\epsilon$ denotes the number of repetition. The control point generation unit 104 may repeatedly update the expression parameter until D becomes smaller than the predetermined threshold value or does not vary any more.

When D becomes smaller than the predetermined threshold value or does not vary any more, the expression control point generating unit 504 may generate the expression control points by inputting a final expression parameter to Equation 11.

Figure 6:
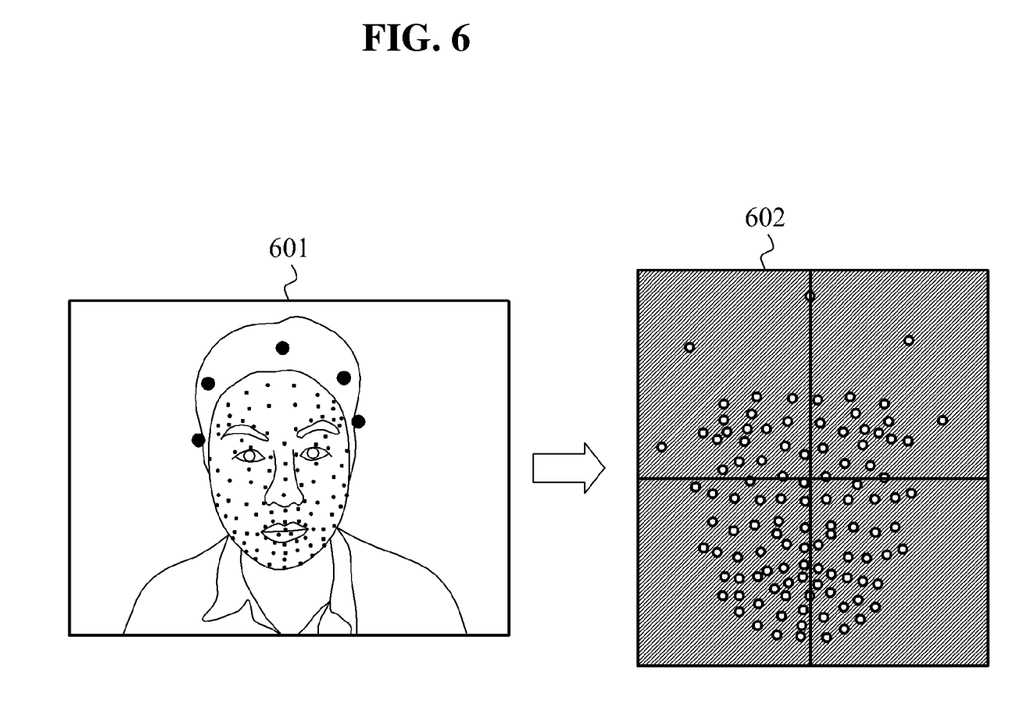
FIG. 6 illustrates motion capture data for generating expression control points according to example embodiments.

FIG. 6 illustrates motion capture data for generating the expression control points according to example embodiments.

In image 601, markers are attached to a face of an actor/actress who is making the reference expression. Image 602 denotes the motion capture data, that is, the position information of the markers. According to example embodiments, the motion capture data is calibrated to be similar to the positions of the feature points based on the reference expression of the user. The expression parameter is extracted from the calibrated motion capture data, accordingly generating the expression control points.

Figure 7:
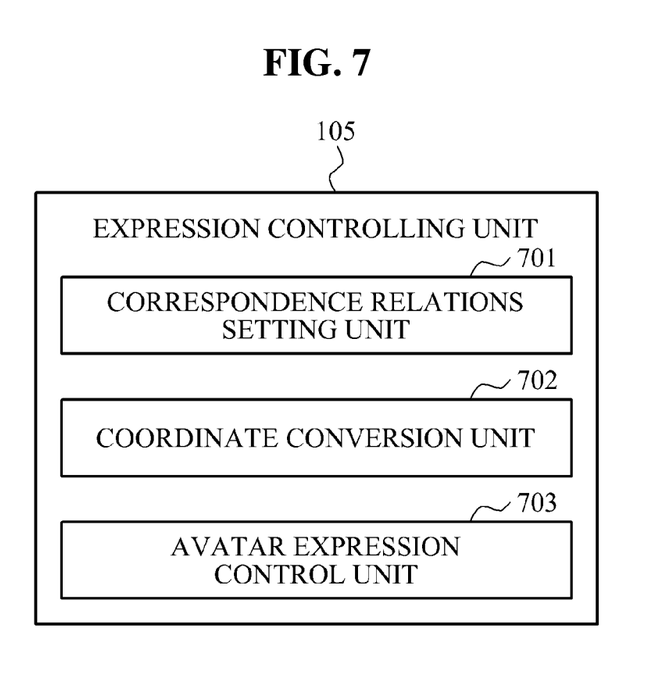
FIG. 7 illustrates a diagram showing an operation of an expression controlling unit shown in FIG. 1.

FIG. 7 illustrates a diagram showing an operation of the expression controlling unit 105 shown in FIG. 1.

The expression controlling unit 105 may include, for example, a correspondence relations setting unit 701, a coordinate conversion unit 702, and an avatar expression control unit 703.

The correspondence relations setting unit 701 may set correspondence relations between control coordinates corresponding to the expression control points and a face mesh of the avatar. The face mesh refers to a mesh adapted to control the avatar corresponding to the face of the user. The correspondence relations setting unit 701 models vertexes selected for control of an animation out of all vertexes of the face mesh, that is, the control coordinates, to have into the same number of points and the same form as the expression control points so that the selected vertexes and the expression control points are one-to-one matched. Next, the vertexes may be labeled.

The correspondence relations setting unit 701 may generate a transformation matrix for setting the correspondence relations between the expression control points and the control coordinates by using three designated vertexes of the expression control points, the three vertexes located between the eyebrows and on a nose. The correspondence relations setting unit 701 may perform global affine transformation with respect to the feature points using the transformation matrix, thereby moving the feature points to the coordinates on the face mesh.

The coordinate conversion unit 702 may convert the coordinates of the expression control points into the control coordinates on the face mesh based on the correspondence relations. More specifically, the coordinate conversion unit 702 may perform the conversion by defining a mapping function F between the expression control points and the control coordinates and by calculating positions of vertexes of a certain image frame using the mapping function F. For example, a radial basis function may be used as the mapping function F between the expression control points and the control coordinates.

The avatar expression control unit 703 may control the expression of the avatar using the control coordinates. Specifically, the avatar expression control unit 703 may generate a pose vector $P_{in}$ showing a plurality of expression information regarding the avatar, based on the control coordinates $C_{in}$. The pose vector $P_{in}$ may be expressed by a weighted sum of a pose vector $P_{in}$ ($P_{in} = \Sigma W_i * P_i$). Here, $W_i$ denotes a weight applied to the pose vector $P_{in}$ to express subtle expressions, wrinkles, and motions of the avatar.

The avatar expression control unit 703 may calculate the weight $W_i$ applied to the pose vector $P_{in}$. The weight $W_i$ may denote a position of input poses in a pose space.

The avatar expression control unit 703 may interpolate the expression of the avatar using the weight $W_i$ and a compensation value $D_i$ regarding the change in the expression of the user, which are calculated from the plurality of expression information. The avatar expression control unit 703 may interpolate a minute change in the input poses, by blending the compensation value $D_i$ regarding the change of the expression in the pose space of the avatar.

In addition, the avatar expression control unit 703 may calculate an initial deformable mesh $M_a(C_{in})$ by a face mesh deformation method adapted to smoothly deform the mesh while maximally reflecting the positions on the control coordinates in accordance with a smoothness restriction based mesh optimization algorithm.

Also, the avatar expression control unit 703 may express a neck of the user, which is connected to a face of the avatar. The avatar expression control unit 703 may perform articulated deformation regarding a neck joint, using 3 rotation values of the neck joint to express a head pose including the neck of the user connected to the face of the avatar. Here, the articulated deformation may be performed using a general skeletal based deformation, not a face animation algorithm.

The avatar expression control unit 703 may seamlessly express a connection part between the face and the neck of the avatar by keeping coordinates of the connection part fixed. In order to naturally express an interface between the articulate deformation and facial deformation, the avatar expression control unit 703 may perform the mesh deformation by fixing vertexes disposed at the connection part between the face and the neck of the avatar, and by setting the weight of the skeletal based deformation for the articulate deformation to 1.

Figure 8:
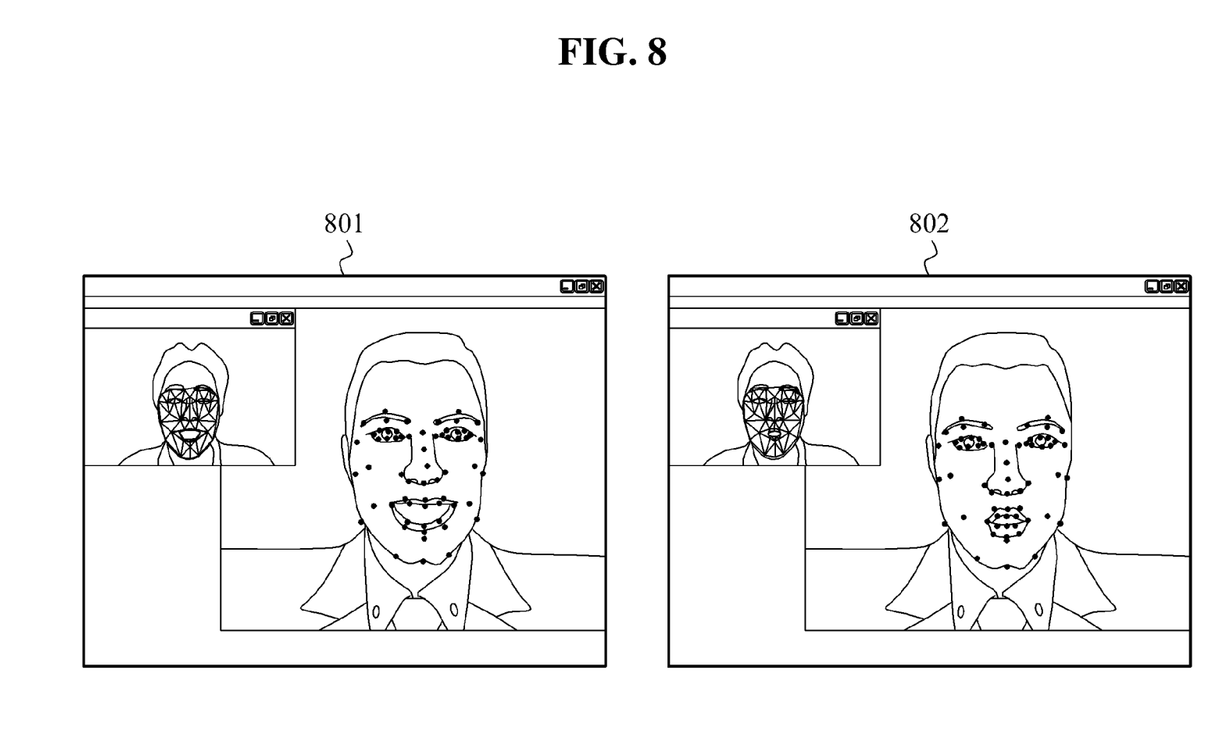
FIG. 8 illustrates a diagram showing an operation of controlling an avatar according to example embodiments.

FIG. 8 illustrates an operation of controlling the avatar according to example embodiments.

Referring to FIG. 8, points shown on an image 801 and an image 802 denote control coordinates $C_i$ regarding a variety of facial expressions. The expression of the user may be reflected to the face of the avatar using the control coordinates $C_i$. For example, various expressions such as smiling, crying, frowning, angry, longing, and impassivity of the user may be reflected to the face of the avatar through the control coordinates $C_i$.

Figure 9:
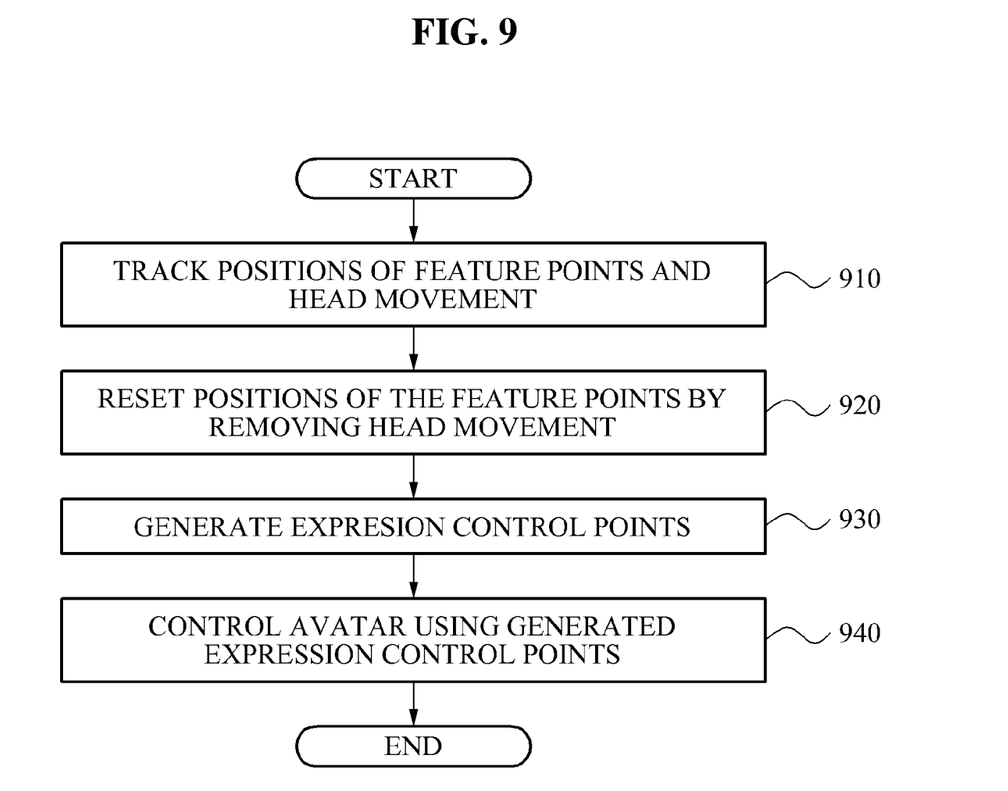
FIG. 9 illustrates a flow chart showing a method of controlling an avatar, according to example embodiments.

FIG. 9 illustrates a flow chart showing a method of controlling an avatar, according to example embodiments.

Referring to FIG. 9, a method of controlling an avatar to appear more naturally by more accurately tracking changes in facial expressions of a user is described.

In operation 910, positions of feature points of a facial expression and a head movement detected from expression images of the user are tracked. Additionally, an eye movement of the user may be tracked.

In operation 920, positions of the feature points of the expression may be reset by removing head movement from the tracked positions of the feature points. The positions of the feature points may be reset with respect to a reference expression of the user by removing the head movement from the positions of the feature points. An expression of the user looking in a forward direction may be used, for example, as a reference position.

In operation 930, expression control points may be generated using an expression parameter based on the reset positions of the feature points. For example, the expression control points may be generated using expression parameters generated from mark-based motion capture data.

In operation 940, an expression of the avatar may be controlled using the generated expression control points. That is, a change in the expression of the user may be reflected to the expression of the avatar. More specifically, an eye movement, a head movement, or an expression of the avatar may be controlled using the expression control points.

According to one or more embodiments of the present description, positions of feature points are tracked without markers, the feature points through which change of expressions of a user may be detected. Therefore, realistic control of an avatar expression may be achieved with a single camera.

Additionally, according to one or more embodiments of the present description, realistic control of an avatar expression is robust to facial expression by removing a head movement from positions of feature points tracked from an expression of a user.

Additionally, according to one or more embodiments of the present description, an expression parameter may be generated by adjusting motion capture data collected using markers based on positions of the feature points extracted from the expression of the user. Next, expression control points are generated. Accordingly, an avatar expression may be more naturally reproduced.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts.

Examples of non-transitory computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. Any one or more of the software units/modules described herein may be executed by a dedicated processor unique to that unit or by a processor common to one or more of the modules. The described methods may be executed on a general purpose computer or processor or may be executed on a particular machine such as the apparatus for controlling an avatar described herein.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. An apparatus comprising:
   a processor configured to control one or more processor-executable units;
   an expression tracking processor unit configured to extract 3D positions of feature points of a facial expression of a face of a user and to track a 3D head movement of the user using the extracted 3D positions of the feature points;

a feature point position resetting processor unit configured to reset the 3D position of the feature points of the facial expression with respect to a reference expression of the user looking forward by removing the 3D head movement from the extracted 3D positions of the feature points; and a control point generating processor unit configured to generate expression control points using an expression parameter based on the reset 3D positions of the feature points wherein the 3D head movement comprises movement, scale and rotation of the head of the user.

2. The apparatus of claim 1, wherein the feature point position resetting processor unit resets the 3D positions of the feature points with a reference expression of the user looking in a forward direction, by using one or more of an inverse translation, an inverse rotation, and an inverse scale based on the 3D head movement.

3. The apparatus of claim 1, wherein the control point generating processor unit generates the expression control points using the expression parameter generated from marker-based motion capture data comprising position information of markers attached to a face making the reference expression.

4. The apparatus of claim 3, wherein the control point generating processor unit updates the expression parameter in accordance with variation of an expression component based on the reset 3D positions of the feature points and variation of an expression component based on a position of the control point generated from the expression parameter.

5. The apparatus of claim 1, further comprising an expression controlling processor unit configured to control an expression of an avatar using the expression control points.

6. The apparatus of claim 5, wherein the expression controlling processor unit controls the expression of the avatar by converting the expression control points into control coordinates on a face mesh for control of the avatar that corresponds to a face of the user.

7. The apparatus of claim 1, wherein the expression tracking processor unit calculates the left surface area of the face and the right surface area of the face by drawing triangles using the representative feature points and by calculating a sum of a surface area of the drawn triangles.

8. The apparatus of claim 1, wherein the expression tracking unit extracts the positions of the feature points of the facial expression, and estimates the head movement based on a head rotation angle using the extracted positions of the feature points.

9. The apparatus of claim 1, wherein the expression tracking unit calculates a left surface area of the face and a right surface area of the face and estimates the head rotation angle using a ratio of the left surface area of the face and the right surface area of the face.

10. A method comprising:

extracting 3D positions of feature points of a facial expression of a face of a user and tracking a 3D head movement of the user using the extracted 3D position of the feature points;

resetting the 3D positions of the feature points of the facial expression with respect to a reference expression of the user looking forward by removing the 3D head movement from the extracted 3D positions of the feature points; and generating, by way of a processor, expression control points using an expression parameter based on the reset 3D positions of the feature points, wherein the 3D head movement comprises movement, scale and rotation of the head of the user.

11. The method of claim 10, wherein the resetting resets the 3D positions of the feature points with a reference expression of the user looking in a forward direction, by using one or more of an inverse translation, an inverse rotation, and an inverse scale based on the 3D head movement.

12. The method of claim 10, wherein the generating of the expression control points generates the expression control points using the expression parameter generated from marker-based motion capture data comprising position information of markers attached to a face making the reference expression.

13. The method of claim 12, wherein the generating of the expression control points updates the expression parameter, in accordance with variation of an expression component based on the reset 3D positions of the feature points and in accordance with variation of an expression component based on a position of the control point generated from the expression parameter.

14. The method of claim 10, further comprising controlling an expression of an avatar using the control point.

15. The method of claim 14, wherein the controlling of the expression of the avatar controls the expression of the avatar by converting the expression control points into control coordinates on a face mesh for control of the avatar that corresponds to a face of the user.

16. A non-transitory computer readable recording medium storing a program to cause a computer to implement the method of claim 10.

17. The method of claim 10, wherein the tracking extracts the positions of the feature points of the facial expression, and estimates the head movement based on a head rotation angle using the extracted positions of the feature points.

18. A method of controlling an avatar, the method comprising:

extracting 3D positions of feature points of a facial expression of a face of a user and tracking a 3D head movement of the user using the extracted 3D positions of the feature points generating, by way of a processor, expression control points for controlling the avatar using an expression parameter obtained by resetting the 3D positions of the feature points of the facial expression with respect to a reference expression of the user looking forward by removing the 3D head movement of the user from the extracted 3D positions of the feature points wherein the 3D head movement comprises movement, scale and rotation of the head of the user.

19. A non-transitory computer readable recording medium storing a program to cause a computer to implement the method of claim 18.

* * * * *